US011489206B2

(12) United States Patent
Shi et al.

(10) Patent No.: US 11,489,206 B2
(45) Date of Patent: Nov. 1, 2022

(54) HYBRID SOLID-STATE CELL WITH A SEALED ANODE STRUCTURE

(71) Applicant: Sakuu Corporation, San Jose, CA (US)

(72) Inventors: Steven Zhichao Shi, Santa Clara, CA (US); Philip Eugene Rogren, Half Moon Bay, CA (US)

(73) Assignee: SAKUU CORPORATION, San Jose, CA (US)

( * ) Notice: Subject to any disclaimer, the term of this patent is extended or adjusted under 35 U.S.C. 154(b) by 0 days.

(21) Appl. No.: 17/515,301

(22) Filed: Oct. 29, 2021

(65) Prior Publication Data

US 2022/0069358 A1     Mar. 3, 2022

Related U.S. Application Data

(60) Continuation-in-part of application No. 17/179,719, filed on Feb. 19, 2021, now Pat. No. 11,165,101.
(Continued)

(51) Int. Cl.
| | | |
|---|---|---|
| *H01M 10/0585* | (2010.01) | |
| *H01M 10/052* | (2010.01) | |
| *H01M 10/0562* | (2010.01) | |
| *B29C 64/106* | (2017.01) | |
| *H01M 4/64* | (2006.01) | |
| *B33Y 80/00* | (2015.01) | |
| *H01M 4/66* | (2006.01) | |
| *H01M 4/04* | (2006.01) | |
| *H01M 50/10* | (2021.01) | |
| *H01M 50/30* | (2021.01) | |
| *H01M 50/183* | (2021.01) | |
| *H01M 50/531* | (2021.01) | |

(52) U.S. Cl.
CPC ....... *H01M 10/0585* (2013.01); *B29C 64/106* (2017.08); *B33Y 80/00* (2014.12); *H01M 4/0416* (2013.01); *H01M 4/0471* (2013.01); *H01M 4/64* (2013.01); *H01M 4/661* (2013.01); *H01M 4/663* (2013.01); *H01M 4/664* (2013.01); *H01M 4/666* (2013.01); *H01M 10/052* (2013.01); *H01M 10/0562* (2013.01); *H01M 50/10* (2021.01); *H01M 50/183* (2021.01); *H01M 50/30* (2021.01); *H01M 50/394* (2021.01); *H01M 50/531* (2021.01); *H01M 2220/20* (2013.01); *H01M 2300/0068* (2013.01)

(58) Field of Classification Search
CPC ................... H01M 4/0471; H01M 4/62–4669
See application file for complete search history.

(56) References Cited

U.S. PATENT DOCUMENTS 8,304,115 B1 * 11/2012 Petkov ................. H01M 4/525
429/304
2020/0313227 A1 * 10/2020 Hu ....................... H01M 10/052

* cited by examiner

*Primary Examiner* — Jonathan Crepeau
(74) *Attorney, Agent, or Firm* — NovoTechIP International PLLC

(57) ABSTRACT

An electrochemical cell is provided which includes a cathode, an anode, an electrolyte separator, and an anode current collector located on the anode. The anode is a three-dimensional (3D) porous anode including ionically conducting electrolyte strands and pores which extend through the anode from the anode current collector to the electrolyte separator. The anode also includes electronically conducting networks extending on sidewall surfaces of the pores from the anode current collector to the electrolyte separator.

20 Claims, 10 Drawing Sheets

Related U.S. Application Data which is a continuation of application No. 16/898,126, filed on Jun. 10, 2020, now Pat. No. 10,971,760, which is a continuation-in-part of application No. 16/702,417, filed on Dec. 3, 2019, now abandoned, which is a division of application No. 16/262,058, filed on Jan. 30, 2019, now Pat. No. 10,535,900.

(60) Provisional application No. 62/624,476, filed on Jan. 31, 2018.

ns that preceded them. Notwithstanding, the manufacturing of a LIB is cost prohibitive in applications for electric vehicles. Furthermore, the low energy density causes electronic gadgets to be larger and bulkier than desirable. Recent improvements in the field have attempted to address these drawbacks with solid state batteries to increase the energy density.

HYBRID SOLID-STATE CELL WITH A SEALED ANODE STRUCTURE

CROSS-REFERENCE TO RELATED APPLICATIONS

The present application is a continuation-in-part of U.S. patent application Ser. No. 17/179,719 entitled "Hybrid Solid-State Cell with a Sealed Anode Structure," filed Feb. 19, 2021, which is a continuation application of U.S. patent application Ser. No. 16/898,126 entitled "Hybrid Solid-State Cell with a Sealed Anode Structure," filed Jun. 10, 2020, which is a continuation-in-part application of U.S. patent application Ser. No. 16/702,417 entitled "Hybrid Solid-State Cell with a Sealed Anode Structure," filed Dec. 3, 2019, which is a divisional application of U.S. patent application Ser. No. 16/262,058 entitled "Hybrid Solid-State Cell with a Sealed Anode Structure," filed Jan. 30, 2019, now U.S. Pat. No. 10,535,900, which claims priority to U.S. Provisional Application No. 62/624,476 entitled "HYBRID SOLID-STATE CELL", filed Jan. 31, 2018, the contents of which are incorporated by reference in its entirety.

The present application is also related to U.S. patent application Ser. No. 15/883,698, entitled "CERAMIC LITHIUM RETENTION DEVICE," filed Jan. 30, 2018, the content of which is hereby incorporated herein by reference in its entirety.

TECHNICAL FIELD

The present application relates to solid state batteries, in particular, lithium-ion batteries, and a monolithic ceramic electrochemical cell housing for such batteries, and associated methods of manufacturing the electrochemical cell housing and related battery devices.

BACKGROUND

Lithium-ion batteries (LIB s) provide significant improvements in energy density and cost per watt hour compared to the nickel-cadmium battery and nickel-metal hydride battery that preceded them. Notwithstanding, the manufacturing of a LIB is cost prohibitive in applications for electric vehicles. Furthermore, the low energy density causes electronic gadgets to be larger and bulkier than desirable. Recent improvements in the field have attempted to address these drawbacks with solid state batteries to increase the energy density.

While battery cells with lithium metal anodes provide superior energy density, rechargeable cells cannot be constructed with lithium metal anodes because of the risk of dendrite formation during the charge cycle. The dendrite formation during the charge cycle results in short circuits that cause explosion and combustion during ignition of the liquid electrolyte. The liquid electrolyte is comprised of highly combustible organic solvents and cannot prevent dendrite growth between the anode and cathode. As a result, LIBs are typically made up of intercalation anodes, which allow lithium ions to be inserted into the crystalline structure rather than being plated onto a current collector. Inserting the lithium ions into the crystalline structure reduces the effective energy storage capacity of the anode to less than 10% the theoretical capacity of lithium metal.

Liquid electrolyte also limits a maximum voltage for the battery. Typical liquid electrolytes decompose at cell voltage above four-volts between an anode and a cathode, which limits the maximum nominal voltage of a LIB cell to about 3.8-volts. Cathode materials that can produce 6 volts against a lithium anode are considered practical, but not usable in cells with liquid electrolyte. The ability to use such high voltage cathodes could increase the energy density of the cells by 50%.

An obvious solution is to use a nonflammable solid electrolyte that resists dendrite formation is stable at cell voltage above 6 volts, and possesses ionic conductivities comparable to that of the liquid electrolytes. While ceramics with high lithium ion conductivities meet those requirements, they also have physical and chemical properties that prevent practical implementations. For example, ceramic materials are typically very rigid and brittle. Furthermore, a practical battery cell is made up of stacks of sub cells, each in turn includes very thin layers of the basic components of an electrochemical cell. Common approaches to constructing a cell include producing the thin layers (<40 µm for the separator) in sheets and assembling them in order. However, the thin layers are fragile and rarely flat, causing a discontinuous contact between individual layers across the meeting surfaces. Applying pressure to the stack of layers tends to improve the contact, but unacceptably increases the risk of fracturing a layer.

Moreover, applying pressure to the stack of layers fails to create an integrated connection between layers, rather it creates an array of point contacts between two surfaces. In some cases, the actual contact between adjacent sheets may be an order of magnitude less than the design area, resulting in an order of magnitude higher current density at the contact points, which exceeds the critical current density causing dendrite growth.

Other drawbacks associated with a cell with lithium metal anode includes a difficulty in achieving a true hermetic seal around the anode space. Any oxygen or water ingress into the anode space will cause oxidation of the lithium, so a non-hermetic seal reduces the capacity and eventually destroys the cell as oxygen or water leak into the cell. Although liquid electrolyte poses significant drawbacks, liquid electrolyte is able to flow into any open space where a lithium atom was oxidized to a lithium ion and move across the separator to the cathode, to maintain the ionic conductivity throughout the cell. Ceramic electrolyte does not possess this ability. As a result, the conventional approach to using ceramic electrolyte is to create a planar interface between the lithium metal and the ceramic electrolyte. In this way, only a thin layer of lithium close to the ceramic electrolyte can oxidize and move into the electrolyte. The result is a very big limitation to the energy storage capacity of the anode. Thin film solid-state cells epitomize this drawback because the useable thickness of the lithium metal anode is only a fraction of the lithium metal deposited.

In addition, there is a risk with solid state batteries that lithium could form dendrites and penetrate through the solid electrolyte, resulting in short circuits. The formation of lithium dendrite is observed when the charging current density is increased to a critical level, i.e., the critical current density. The critical current density is the current density at and above which lithium dendrite propagates through the solid electrolyte, causing a short circuit. The critical current density is typically below 0.6 mA/cm$^2$, which is normalized to the geometric area of the anode or cathode. To match the charge rate (C-rate) performance of practical applications, the critical current density needs to be increased to the 3 mA/cm$^2$ range.

Hence, there is a need to address the above-stated shortcomings of current solid-state battery development efforts.

SUMMARY

An electrochemical cell is provided which includes a cathode, an anode, an electrolyte separator, and an anode current collector located on the anode. The anode is a three-dimensional (3D) porous anode including ionically conducting electrolyte strands extending through the anode from the anode current collector to the electrolyte separator, pores extending through the anode from the anode current collector to the electrolyte separator, and an electronically conducting network extending on sidewall surfaces of the pores from the anode current collector to the electrolyte separator.

A method is provided for forming a three-dimensional (3D) porous anode for an electrochemical cell, including a cathode, an anode, an electrolyte separator, the separator comprised of a ceramic material and located between the cathode and anode, and an anode current collector, formed on the anode, wherein the anode is located between the anode current collector and the electrolyte separator. In particular, the method comprises mixing a first precursor material, a second precursor material, and a ceramic electrolyte precursor material together to form a mixture, depositing the mixture as a layer where the anode is to be formed, and sintering the mixture to form the 3D porous anode with ionically conducting electrolyte strands extending through the anode from the anode current collector to the electrolyte separator, pores extending through the anode from the anode current collector to the electrolyte separator, and an electronically conducting network extending on sidewall surfaces of the pores from the anode current collector to the electrolyte separator, wherein the second precursor material is a sacrificial material configured to decompose during formation of the pores by the sintering of the second precursor material, and the first precursor material is a precursor material which forms a coating of the electronically conducting network on the sidewall surfaces of the pores formed by sintering the second precursor material and the ceramic electrolyte precursor material.

Another method is provided for forming a three-dimensional (3D) porous anode for an electrochemical cell, including a cathode, an anode, an electrolyte separator, comprised of a ceramic material, located between the cathode and anode, and an anode current collector, formed on the anode, wherein the anode is located between the anode current collector and the electrolyte separator. The method comprises depositing the mixture of a powder of solid electrolyte material and a powder of a sacrificial pore forming material as a layer where the anode is to be formed, sintering the mixture to form the 3D porous anode, infusing an electronically conducting material into the 3D porous anode after the sintering, to coat sidewall surfaces of the pores, wherein the electronically conducting material is comprised of a material which conducts electrons from the anode current collector along the sidewall surfaces of the pores to combine with lithium ions from the ionically conducting electrolyte strands at the sidewall surfaces of the pores to form lithium in the pores during charging of the lithium-ion battery comprising the electrochemical cell.

In the above descriptions, and throughout the following disclosure, it is noted that the term "ionically conducting" refers to the ability of a material, for example, material forming the electrolyte strands, to readily conduct ions through the material. In other words, the material is an ionically conductive material or ion-conducting material. Similarly, the term "electronically conducting" refers to the ability of a material, for example, material forming the coatings on sidewall surfaces of the pores, to readily conduct electrons through the material. In other words, the material is an electronically conductive material or electron-conducting material.

Embodiments disclosed herein include a monolithic ceramic electrochemical cell housing, as well as electrochemical cells, and, more specifically, batteries. The housing includes two or more electrochemical sub cell housings. Each of the electrochemical sub cell housing includes an anode receptive space, a cathode receptive space, an electrolyte separator between the anode receptive space and the cathode receptive space, and an anode sub-cell current collector and a cathode sub-cell current collector.

In some implementations, the anode receptive spaces are configured as hermetically sealed volumes, partially filled with strands of solid-state electrolyte material. The solid-state electrolyte material includes a high-density ceramic. The high-density ceramic can be selected from a group consisting of sulfides, borides, carbides, nitrides, phosphides, phosphates, oxides, selenides, fluorides, chlorides, bromides, and iodides, or combinations thereof. The most useful materials include oxides, sulfides, phosphates, and nitrides. More specifically, preferred materials can be selected from a group consisting of garnet structure oxides including lithium lanthanum zirconium oxide (LLZO) and LLZO with various dopants including aluminum, niobium, gallium, tantalum, and tungsten, phosphate glass ceramics such as lithium aluminum germanium phosphate (LAGP) and lithium aluminum titanium phosphate (LATP), sulfides such as thiophosphate and argyrodite, and lithium phosphorus oxynitride (LiPON). The strands of solid-state electrolyte can form a network of continuous ionic conductivity between the separator and the anode current collector.

The strands of electrolyte can occupy between 20% and 80% volume of the anode receptive spaces. The anode current collector can serve as current collector for the anode receptive spaces of the electrochemical sub cell housing and second anode receptive spaces of a second adjacent electrochemical sub cell housing.

The cathode receptive spaces can be partially filled with strands of ceramic electrolyte material between 1% and 60% volume. In another implementation, the cathode receptive spaces can be devoid of ceramic electrolyte material. The monolithic ceramic electrochemical cell housing can also include insulating material between each of the electrochemical sub cell housing.

The cathode layer can include a seal structure in a filling aperture configured to contain catholyte. The seal structure can be configured to isolate the catholyte and provide pressure relief from the cathode receptive spaces. The anode receptive spaces can be filled with anode active material during an initial charging phase.

The anode receptive spaces can be sealed and the cathode receptive spaces can be partially sealed. The monolithic ceramic electrochemical cell housing can also include an anode electrical contact connecting anode sub-cell current collectors and a cathode electrical contact connecting cathode sub-cell current collectors.

A manufacturing method for assembling a monolithic ceramic electrochemical cell housing is also provided. The method can include depositing precursor materials in a flexible format to form a multi-layer structure. The method can also include heating the multi-layer structure to convert the precursors into a single monolithic structure void of physical interfaces between deposited layers. In some implementations, the format is fluid, selected from a group consisting of pastes, flowable powders and green tapes. In some implementations, the precursors are deposited using additive manufacturing techniques.

BRIEF DESCRIPTION OF THE DRAWINGS

In order to describe the manner in which the above-recited disclosure and its advantages and features can be obtained, a more particular description of the principles described above will be rendered by reference to specific examples illustrated in the appended drawings. These drawings depict only example aspects of the disclosure, and are therefore not to be considered as limiting of its scope. These principles are described and explained with additional specificity and detail through the use of the following drawings.

DETAILED DESCRIPTION

Figure 1:
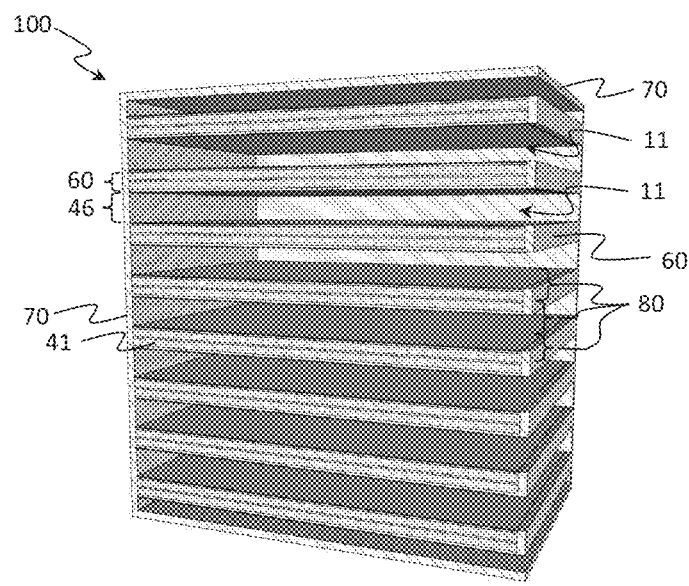
FIG. 1 illustrates an exemplary solid-state cell, in accordance with an implementation of the disclosure.

In the following detailed description, numerous specific details are set forth by way of examples in order to provide a thorough understanding of the relevant teachings. It will be apparent to persons of ordinary skill, upon reading this description, that various aspects can be practiced without such details. In other instances, well known methods, procedures, components, and/or circuitry have been described at a relatively high-level, without detail, in order to avoid unnecessarily obscuring aspects of the present teachings.

In view of the foregoing, implementations disclosed herein are directed to an apparatus and a manufacturing process for producing a ceramic electrochemical cell, and for forming an electrochemical cell, and, more specifically, a battery, such as a lithium-ion battery, from a monolithic ceramic electrochemical cell housing during a charging operation to form anode material, such as lithium, in an anode receptive space of the monolithic ceramic electrochemical cell housing. In the following disclosure and claims it is noted that, when reference is being made to an electrochemical cell or a battery, the term "anode" is intended to include a state where the electrochemical cell or battery is discharged, so that the anode is in a temporary state of being an anode receptive space waiting to be recharged and filled with anode material. Electrochemical cells and batteries comprising the monolithic ceramic electrochemical cell housings are produced at a per watt costs below current lithium-ion batteries (LIBs). The volumetric energy densities of the batteries are significantly higher than that of the current LIBs, and in capacities ranging from a few milliwatt hours to kilowatt hours. In some implementations, multi-material additive processes are incorporated to assemble the cells from precursors of the final materials, and convert the precursors to their final properties when the assembly is complete. These multi-material additive processes are implemented to eliminate the drawbacks of assembling cells from ceramic sheets with their final properties. The precursors can be in a fluid or plastically deformable sheet state, which can be layered and bonded together as precursors. The precursors in this state are also easy to handle and form into the desired configuration.

As a result, after the conversion to the final properties the resulting structure is a monolithic block with no discernable interface where adjacent layers were joined. The interface of the layers of dissimilar precursor materials is designed chemically and physically to optimize the conductivity between the two final materials. Specifically, a true chemical bond can be formed at the interface, avoiding the possibility of uncontrolled reactions with the environment or incomplete contact between materials which will compromise the desired properties of the interface. Conversion of the precursors in some implementations include heat treatment processes that remove organic material components of the precursors, convert the remaining constituents to the final desired chemistry, and sinter the final materials to their respective density targets.

The disclosed multi-material additive processes also produce a design that allows the ceramic electrolyte to maintain ionic conductivity completely across an electrode space regardless of the state of charge. For example, a porous structure of electrolyte can be created across an anode space, which forms a fully interconnected web of ionic conducting material from the solid electrolyte separator to the current collector of the electrode. The porous structure can be configured such that the distance between adjacent portions of the ionically conducting web is less than two-times the maximum distance an ion can be transferred from an anode active metal (e.g., lithium) into the ionically conducting electrolyte.

The disclosed multi-material additive processes also provide a cost-effective configuration of a hybrid cell design that incorporates a cathode with a similar composition to the typical cathodes employed in conventional lithium-ion cells, and an anode that it is a hermetically sealed space. Specifically, the anode can be bounded by the current collector on one side, the electrolyte separator on the opposite side, filled with the ionically conducting porous structure, and void of any intercalation host or active charge transfer species immediately following manufacture of the cell structure. The active charge transfer species (e.g., lithium) can be introduced to the anode receptive space by plating lithium from the cathode to the anode current collector during the conditioning, or first charging of the cell.

In accordance with another aspect of the present disclosure, as discussed above, there is a risk with solid state battery that lithium may form dendrites and penetrate through the solid electrolyte, resulting in a short circuit of the solid-state battery. The formation of lithium dendrites may be observed when the charging current density is increased to a critical level, referred to as the critical current density. The critical current density is thus the current density at and above which lithium dendrite propagates between the anode and the cathode through the solid-state electrolyte, and causes a short-circuit. The critical current density is typically below 0.6 mA/cm$^2$ when normalized to the geometric area of the anode or cathode. However, to match the charge rate (C-rate) performance of practical applications, it may be advantageous that the critical current density is increased to a range of 3 mA/cm$^2$ or greater.

In various implementations, increasing the critical current density may be achieved by using a three-dimensional (3D) porous anode, i.e., an anode which includes a large number of pores, each having a surface area, wherein the active area for lithium plating may be substantially increased by the presence of the additional surface area provided by the pores. For example, for a 3D porous anode having a thickness of 50 μm and 60% porosity, the active area per cm$^2$ of geometric area of the anode can be increased to 12 cm$^2$ and 120 cm$^2$, with pore diameters ranging from 10 μm to 1 μm, respectively. Such a large active area may enable the solid-state battery to be operated at a higher practical C-rate such as, e.g., a current density of 3 mA/cm$^2$, while maintaining the local current density below the critical current density, and avoiding lithium dendrite formation and short-circuit as a result.

In various implementations, electronically conducting networks may be incorporated inside the pores of the 3D porous anode, on the surface of the pores of the 3D porous anode. The electronically conducting networks may be electrically connected to, e.g., the anode current collector. The presence of the electronically conducting networks may allow lithium plating not only at the current collector, but also at the surface of the pores, thus significantly reducing the local current density and avoiding or reducing lithium dendrite formation and short circuit.

In various implementations, the pores of the 3D porous anode may be partially or completely filled with lithium metal after the initial charging of the battery. The electronically conducting networks may include electronically conducting materials such as, e.g., materials selected from a carbon material, a metal, a semiconductor, a conducting polymer, an electron conducting ceramic or combinations thereof.

In various implementations, the electronically conducting networks may be incorporated in the solid-state electrolyte after the porous anode structure is formed. In this case, the 3D porous anode may have at least one side open without a sealed wall. The opening allows infusion of the electronically conducting materials into the porous structure. In implementations, lithium metal may be infused to form the electronically conducting networks, where a thin layer of lithium may be coated at the surface of the pores. In other implementations, carbon may be infused to form electronically conducting networks, where a thin layer of carbon is coated at the surface of the pores. The carbon may be introduced from a carbon dispersion or a hydrocarbon precursor. The carbon can be selected from a group consisting of carbon black, activated carbon, graphite, graphene, carbon fiber, and carbon nanotubes, or combinations thereof. In other implementations, copper may be infused to form the electronically conducting networks, where a thin layer of copper may be coated at the surface of the pores. The copper may be introduced from, e.g., an organometallic precursor, or via chemical vapor deposition (CVD), atomic layer deposition (ALD) and electroless plating. In other implementations, silver may be infused to form the electronically conducting networks, where a thin layer of silver may be coated at the surface of the pores. The silver may be introduced from, e.g., an organometallic precursor, or via chemical vapor deposition (CVD), atomic layer deposition (ALD) and electroless plating. In other implementations, nickel may be infused to form the electronically conducting networks, where a thin layer of nickel may be coated at the surface of the pores. The nickel may be introduced from, e.g., an organometallic precursor, or via chemical vapor deposition (CVD), atomic layer deposition (ALD) and electroless plating. In a preferred implementation, the electronically conducting networks are formed from precursors incorporated in the precursor materials used to create the 3D porous anode structure. For example, the precursors for the electronically conducting materials are transformed into an electronically conducting coating on the surface of the pores when the pores are formed during sintering of a structure made with the anode precursor materials.

In various implementations, a method is provided for forming a 3D porous anode receptive space for a monolithic electrochemical cell housing that can be used, for example, for forming a lithium-ion battery. The monolithic electrochemical cell housing can include a cathode, an anode receptive space, an electrolyte separator, the separator comprised of a ceramic material and located between the cathode and anode receptive space, and an anode current collector, formed on the anode receptive space. The anode receptive space is located between the anode current collector and the electrolyte separator. In particular, the method comprises mixing a first precursor material, second precursor material, and a ceramic electrolyte precursor material together to form a mixture, depositing the mixture as a layer where the anode receptive space is to be formed, and sintering the mixture to form the 3D porous anode receptive space. The 3D porous anode receptive space includes ionically conducting electrolyte strands extending through the anode receptive space from the anode current collector to the electrolyte separator, pores extending through the anode receptive space from the anode current collector to the electrolyte separator, and an electronically conducting network extending on sidewall surfaces of the pores from the anode current collector to the electrolyte separator. The electronically conducting network is configured to conduct electrons from the anode current collector along the sidewall surfaces of the pores to combine with lithium ions from the electrolyte to form lithium in the pores during charging of a battery, such as a lithium-ion battery, formed from the monolithic electrochemical cell housing. The second precursor material is a sacrificial material configured to decompose during formation of the pores by the sintering of the second precursor material and the ceramic electrolyte precursor material, and the first precursor material is a material which forms a coating of the electronically conducting network on the sidewall surfaces of the pores formed by sintering the second precursor material and the ceramic electrolyte precursor material.

In various implementations, another method is provided for forming a 3D porous anode for a lithium-ion battery including a cathode, an anode, an electrolyte separator, comprised of a ceramic material, located between the cathode and anode, and an anode current collector, formed on the anode, wherein the anode is located between the anode current collector and the electrolyte separator. The method comprises depositing the mixture of a powder of solid electrolyte material and a powder of a sacrificial pore forming material as a layer where the anode is to be formed, sintering the mixture to form the 3D porous anode, infusing an electronically conducting material into the 3D porous anode after the sintering, to coat sidewall surfaces of the pores, wherein the electronically conducting material is configured to conduct electrons from the anode current collector along the sidewall surfaces of the pores to combine with lithium ions from the electrolyte to form lithium in the pores during charging of the lithium-ion battery.

Figure 2:
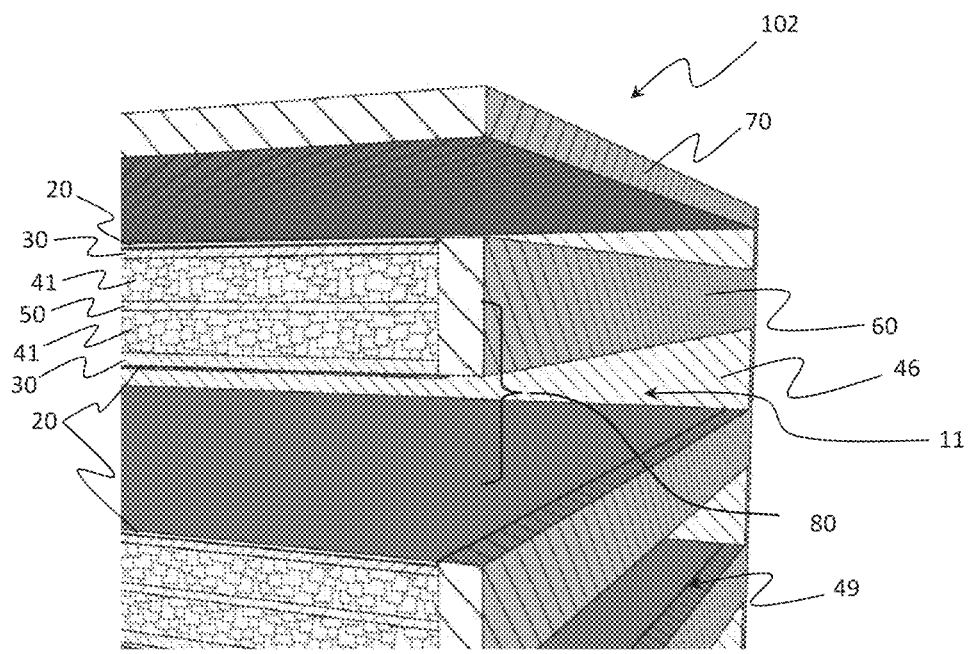
FIG. 2 illustrates an integrated framework of the exemplary solid-state cell of FIG. 1, in accordance with an implementation of the disclosure.

FIG. 1 illustrates an exemplary solid-state cell 100 in accordance with an implementation of the disclosure. The general structure of the solid-state cell 100 can include a monolithic and highly integrated framework 102, as illustrated in FIG. 2. The integrated framework 102 can include one to thousands of stacked sub cells housings 80.

Referring to FIG. 2, each sub-cell housing 80, with alternating thin layers, can include an anode receptive space 41 and a cathode receptive space 11. The anode receptive space 41 and cathode receptive space 11 can be separated by a thin separator 30, which may be made up of solid-state electrolyte. Each anode receptive space 41 can be made up of a hermetically sealed, defined volume, partially filled with strands of solid-state electrolyte material (shown in FIG. 3 as 32).

Figure 3:
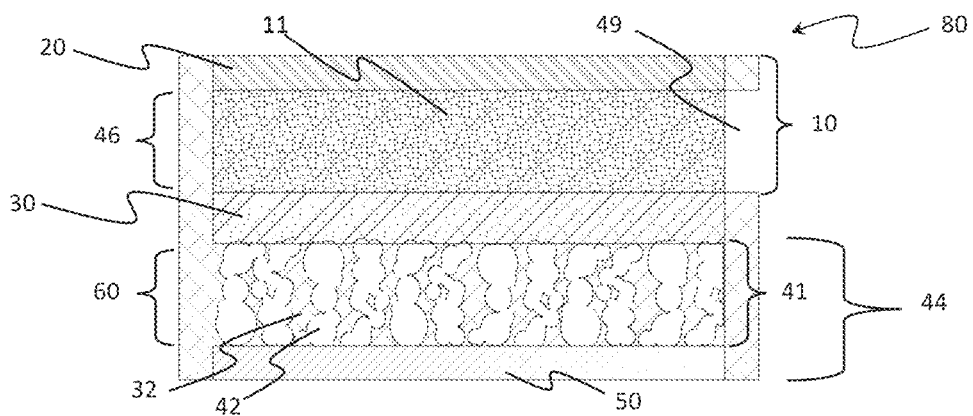
FIG. 3 illustrates a sub-cell housing, in accordance with an implementation of the disclosure.

Referring to FIG. 3, the hermetically sealed, defined volume, partially filled with strands of solid-state electrolyte material 32 form a region of controlled porosity (referred to herein as the "empty space 42"). The solid-state electrolyte material 32 can include a high-density ceramic. For the purposes of this example, the high-density ceramic can include, but is not limited to, sulfides, borides, carbides, nitrides, phosphides, phosphates, oxides, selenides, fluorides, chlorides, bromides, iodides, or combinations of thereof. The most useful materials include oxides, sulfides, phosphates, and nitrides. More specifically, preferred materials can be selected from a group consisting of garnet structure oxides including lithium lanthanum zirconium oxide (LLZO) and LLZO with various dopants including aluminum, niobium, gallium, tantalum, and tungsten; phosphate glass ceramics such as lithium aluminum germanium phosphate (LAGP) and lithium aluminum titanium phosphate (LATP); sulfides such as thiophosphate and argyrodite; and lithium phosphorus oxynitride (LiPON). The high-density ceramic can include any ceramic that exhibits room temperature conductivities of the intended charge transfer ion of the specific battery design, greater than $1 \times 10^{-6}$ S/cm. In some implementations, the charge transfer ion is $Li^+$. In alternative implementations, the charge transfer ion can be chosen from the group including $Na^+$, $Mg^{2+}$, $K^+$, and $Al^{+3}$.

The strands of solid-state electrolyte 32 can form a network of continuous ionic conductivity between the separator 30 and the anode current collector 50. The porous electrolyte structure can be made from solid-state electrolyte material, similar to the separator 30, but with a controlled structure. Continuous strands of electrolyte can be surrounded by the empty space 42 and extend from the separator 30 to the current collector 50. The empty space 42 can also extend from the separator 30 to the anode current collector 50. In some implementations, the strands of electrolyte can occupy between 20% and 80% of the volume of the anode receptive space 41 (also shown in FIG. 2) while the void space occupies the remaining volume. In some implementations, the porous structure is designed such that the average distance between adjacent strands of electrolyte material can be between 1 μm and 40 μm. Referring back to FIG. 2, the anode receptive spaces 41 for two adjacent sub cell housings 80 can be juxtaposed, separated by the current collector 50. The current collector 50 can serve as current collector for both anode receptive spaces 41 of the two adjacent sub cell housings 80.

Each cathode receptive space 11 can also be a defined volume partially filled with strands of ceramic material. In some implementations, the cathode receptive space 11 can form a region of controlled porosity. In other implementations, the cathode receptive space 11 can be an open defined volume free of any ceramic material. In some implementations, strands of electrolyte material in the cathode receptive space 11 can occupy from 0% to 60% of the total volume. Furthermore, the strands of electrolyte material can be designed such that the average distance between adjacent strands of electrolyte material can be between 0.02 mm and 200 mm.

The strands of ceramic material can include solid state electrolyte material that provides ionic conductivity across the thickness of the cathode space similar to the porous structure in the anode receptive space 41. Alternatively, the ceramic strands can be provided as mechanical elements to control the precise thickness of the cathode receptive space 11.

In some implementations, the cathode receptive spaces 11 of two adjacent sub cell housings 80 can be configured such that one cathode receptive space serves said two adjacent sub cell housings 80. Referring momentarily to the cathode current collectors 20 in FIG. 2 and FIG. 11. Each of the two adjacent sub cells can be configured with an electron conducting layer directly on the cathode side of the separators 30. The cathode receptive space 11 (shown in FIG. 11) of the two sub cell housings can be bounded on either side by cathode current collectors 20 of the two adjacent cell housings. The distance between the separators 30 of the two adjacent sub cell housings can be calculated to create a cathode receptive space 11 volume that includes an amount of catholyte that meets the design parameters of the two adjacent sub cells.

Figure 11:
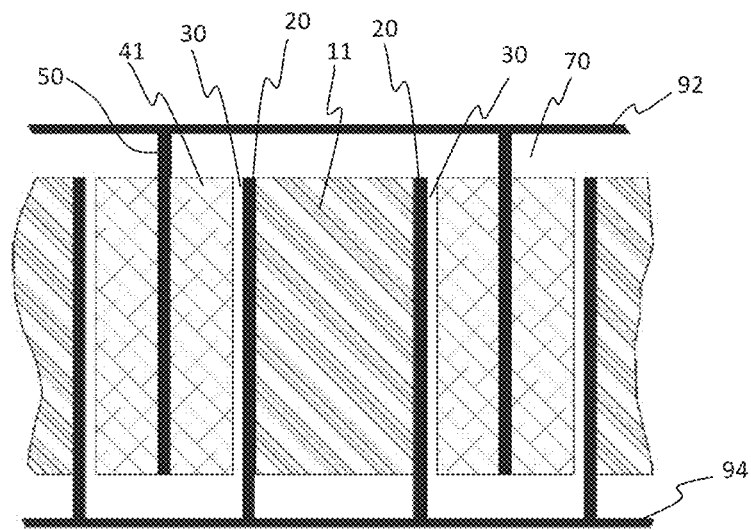
FIG. 11 illustrates a cell schematic of the exemplary solid-state cell of FIG. 1, in accordance with an implementation of the disclosure.

With reference to FIGS. 2 and 11, a cathode current collector 20 of a sub-cell 80 may be positioned in direct contact with a surface of a sub-cell separator 30, opposite the surface defining one surface of the sub-cell anode receptive space 41, thus defining one boundary of cathode receptive space 11. Two adjacent sub-cells 80 may be juxtaposed in contact, cathode receptive space 11 to cathode receptive space 11, with current collectors for each of the two cathode receptive spaces 11 positioned in contact with the cathode side of the separator 30 of the respective sub-cell 80. The resulting cathode receptive space 11 may thus be a volume sufficient to contain cathode material for two sub-cells 80 and the major surfaces of cathode receptive space 11 defined by the current collectors 20 of the two adjacent sub-cells.

The advantages of this arrangement are that two very thin current collectors 20 supported on a separator 30 can occupy less volume than a single unsupported current collector positioned to separate two cathode receptive spaces 11. Secondly, positioning the current collectors at the periphery of a cathode receptive space creates a single double thick cathode receptive space, facilitating easier insertion of the cathode material into the cathode receptive space 11.

The cathode current collectors 20 may be comprised of a metal or a metal alloy or a conductive ceramic, or a conductive carbon-based material. Cathode current collectors 20 may be further comprised of an ion conducting material chosen to conduct the intended charge transfer ion of the specific battery design. The ion conducting material of the cathode current collectors 20 may be the same solid-state electrolyte as the electrolyte comprising the anode receptive space 41 and the separator 30. In one implementation, the ion conducting material is lithium lanthanum zirconium oxide. The metal or metal alloy or conductive ceramic or conducting carbon-based material of the cathode current collectors 20 may comprise a porous film that forms an electronic percolating network through the plane of cathode current collector 20. The metal or metal alloy or conductive ceramic or conducting carbon based material of the cathode current collectors 20 may comprise any value or values between 20% and 99% by volume of the cathode current collector 20. In some implementations, a current collector 20 may be present on only one side of cathode receptive space 11.

Figure 9:
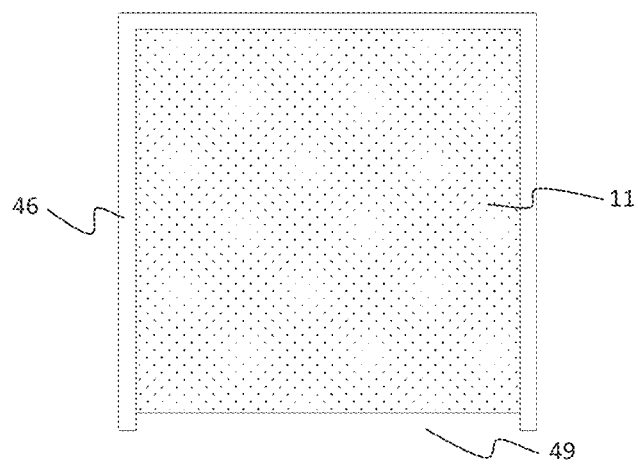
FIG. 9 illustrates a cathode layer of the exemplary solid-state cell of FIG. 1, in accordance with an implementation of the disclosure.

Referring back to FIG. 2, the cathode receptive space 11 can be further defined by low porosity ceramic walls 46 extending between the separators 30 to create a seal between the separators 30. The ceramic walls (shown in FIG. 9 as 46) can extend around at least 60% of the periphery of the cathode receptive space 11. The low porosity ceramic can be made up of solid-state electrolyte.

Figure 7:
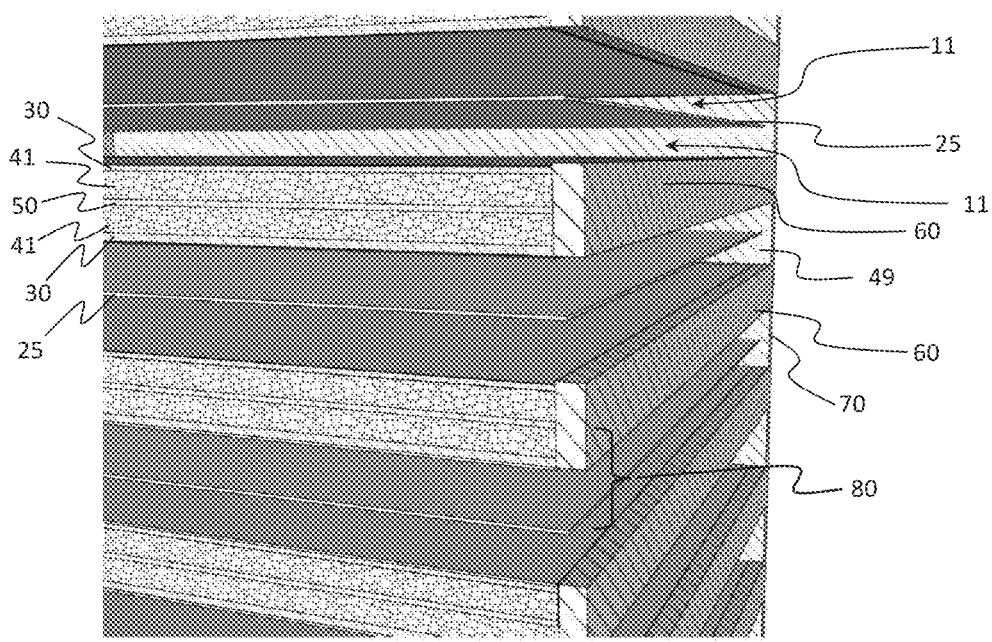
FIG. 7 illustrates an alternate integrated framework of the exemplary solid-state cell of FIG. 1, in accordance with an implementation of the disclosure.

With reference to FIG. 3, in some implementations, each sub-cell housing 80 can be separated from surrounding sub-cell housings 80 by layers of insulating material 25 (shown in FIG. 7). The insulating material can be disposed between the separators of adjacent sub cell housings, at a calculated distance. The distance can be calculated to create cathode receptive space 11 volume and anode receptive space 41 volume to contain an amount of catholyte and charge transfer species. The amount of catholyte and charge transfer species are designed to meet the configuration parameters of the sub-cell 80. In these implementations, current collectors can be disposed on the surfaces of the layer of insulating material 25 or anywhere within the cathode receptive space 11.

Figure 8:
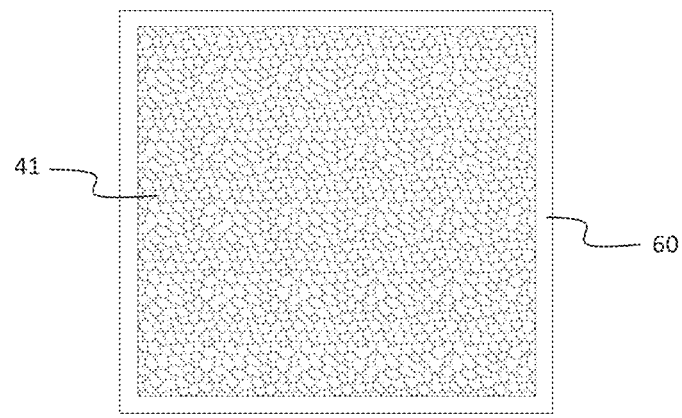
FIG. 8 illustrates an anode layer of the exemplary solid-state cell of FIG. 1, in accordance with an implementation of the disclosure.

FIG. 3 illustrates a sub-cell housing 80, in accordance with an implementation of the disclosure. Each sub-cell housing 80 is a layered structure, which can include solid-state electrolyte with alternating layers of high density electrolyte material. The sub-cell housing 80 also can include layers with a high degree of controlled porosity. The layers include anode layers 44, cathode layers 10, and separator layers 30. The anode and cathode layers can be made up of high porosity while the separator layers can be made up of high density electrolyte. The anode layers 44 can include anode receptive spaces 41, low porosity boarders 60 (Shown in FIG. 8), and anode current collectors 50. The cathode layers 10 can be made up of cathode receptive space 11, low porosity boarder 46 and a filling aperture 49 (shown in FIG. 9). The low porosity border 46 can be made up of high density ceramic material. In some implementations, the high density ceramic material can include solid-state electrolyte. The low porosity border 60 completely and hermetically seals the anode receptive spaces 41 from the environment. The low porosity border 46 can also partially surround the cathode receptive spaces 11, physically isolating the cathode receptive space from other layers in the sub-cell housing.

Referring back to FIG. 3, the separators 30 are configured to separate the anode receptive space 41 of each sub-cell housing from the cathode receptive space 11 of each sub-cell to eliminate contact between the spaces. The separator layer 30 can be configured with a precise thickness to ensure it is void of open pores. In a preferred implementation, the thickness of the separator layer can be range between 0.00001 mm to 1.0 mm. The thickness of the anode receptive space 41 and cathode receptive space 11 can be configured to optimize the performance of the specific materials. The configuration of the open volume and the solid-state ionically conducting electrolyte strands are also designed to optimize the performance of the specific materials.

As indicated above, the cathode layers 10 can include cathode receptive space 11 partially or completely filled with catholyte. The low porosity ceramic walls can be positioned around at least a portion of the cathode receptive space 11 and the cathode current collectors 20 within the cathode receptive space.

The cathode layer 10 can also include a seal structure in a filling aperture 49 (shown in FIG. 2 and FIG. 9) configured to contain the catholyte. The seal structure can be configured to protect the catholyte from the environment and provide pressure relief from the cathode receptive space 11. The separator layer 30 can include electrically insulated ceramic material. In some implementations, at least a central portion of the electrically insulated ceramic material includes solid-state electrolyte appropriate for the design charge transfer species of the sub-cell. The low porosity ceramic walls can also include solid-state electrolyte material and serve as protective packaging for the sub-cell.

In a preferred implementation, the multilayered structure of anode receptive space 41, the cathode receptive space 11, the separators 30 and the current collectors 50 and 20 can be assembled without either catholyte or anode active materials present. The catholyte material can be inserted through the filling aperture 49 (shown in FIG. 2 and FIG. 9) and sealed in place in the cathode layer 10. The catholyte material can be made up of cathode active material, an electrolyte for the charge transfer ion of the sub-cell, and an electron conducting material. The electron conducting material can include carbon, a metal or an electron conducting ceramic. The cathode active material can be made up of an intercalation host material suitable for the charge transfer ion.

Figure 4:
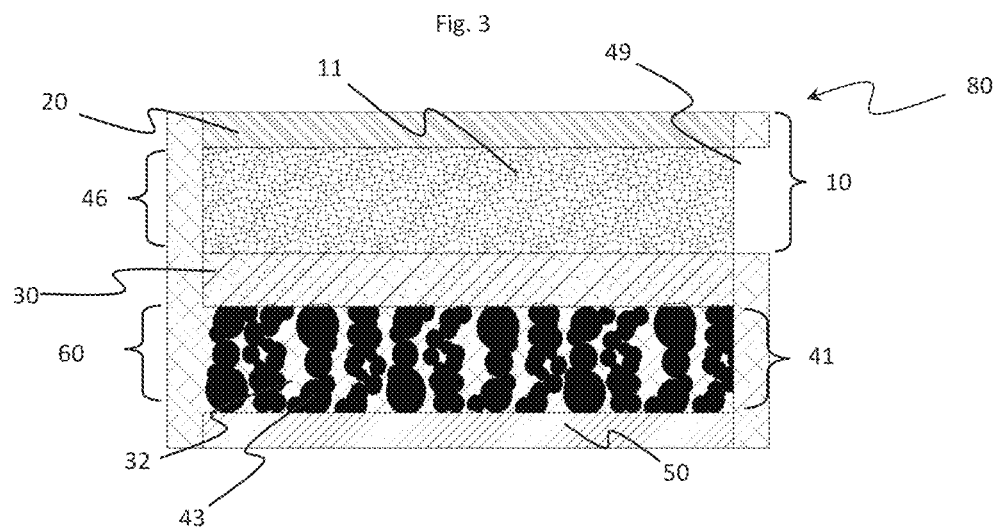
FIG. 4 illustrates a sub-cell housing, in accordance with an implementation of the disclosure.
Figure 5:
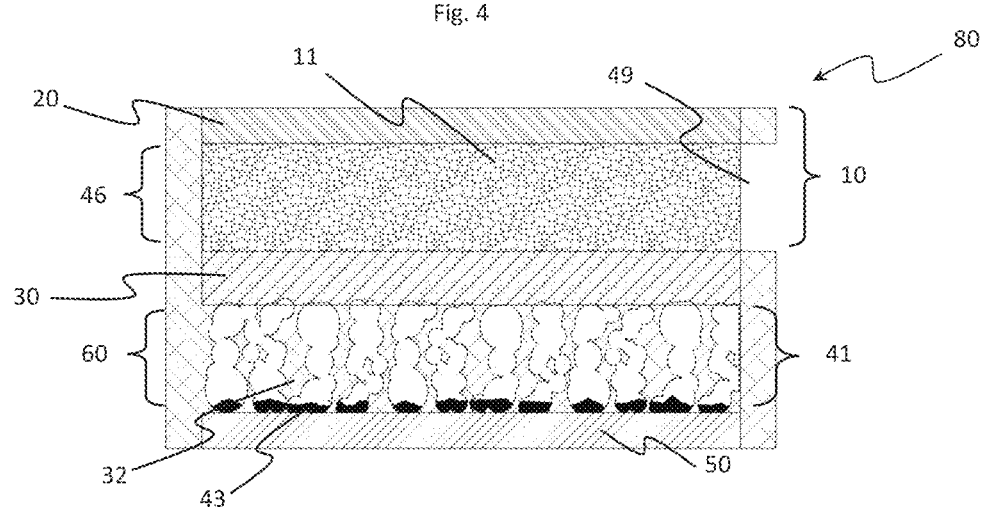
FIG. 5 illustrates a sub-cell housing, in accordance with an implementation of the disclosure.

Referring specifically to FIG. 5, the empty space 42 of the porous anode receptive space 41 can be partially filled or completely filled with anode active material 43 during the initial charging of the battery. In some implementations, the anode active material 43 can include lithium metal. The anode active material can be electroplated onto the anode current collector to initiate the filling of the anode receptive space 41. The anode active material can then be electroplated onto the previously plated anode active material until the anode receptive space 41 fills with the anode active material 43, as illustrated by FIG. 4.

The catholyte material can be inserted in the cathode receptive space 10 by converting the catholyte material to a fluid and drawing the fluid material into the porous structure under vacuum force. In some implementations, converting the catholyte materials to a fluid can include melting the catholyte materials, compounding the catholyte materials into a mixture of solid and liquid materials, dissolving the catholyte materials in a solvent, or converting the catholyte materials to a fine powder. In an alternative implementation, the catholyte material can be configured as solid or semi solid structure. The structure can be shaped to precisely fit the cathode receptive spaces. In this implementation, the catholyte material structures can directly inserted and secured in the respective cathode receptive spaces.

The sub-cell can be configured to enable the introduction of the catholyte material into the cathode receptive spaces, without damaging the rest of the structure. For example, the sub-cell can be configured such that all cathode receptive spaces are sealed continuously along at least three quarters of the edges of the sheet like volume, by low porosity ceramic walls 46. In some implementations, the cathode receptive spaces are open from over $\frac{1}{1,000}$ to $\frac{1}{2}$ of the total circumference. In some implementations, the cathode receptive spaces are open at a first location of the stack of cell layers. The first location enables the filling aperture of the cathode receptive spaces to be immersed into a fluid catholyte material. In some implementations, the filling aperture can be fully immersed in the fluid catholyte material.

Figure 10:
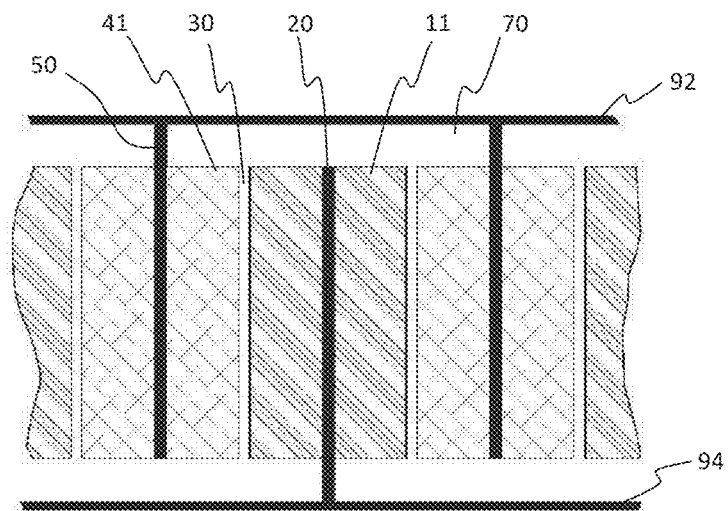
FIG. 10 illustrates a cell schematic of the exemplary solid-state cell of FIG. 1, in accordance with an implementation of the disclosure.

Further as illustrated in FIG. 10 and FIG. 11, the sub-cell includes an anode electrical contact 92 connecting all of the anode sub cell current collectors. The anode electrical contact can include an extension for making electrical contact on the outside of the sub-cell. The sub-cell also includes a cathode electrical contact 94 connecting all of the cathode sub cell current collectors. The cathode electrical contact can also include an extension accessible for making electrical contact on the outside of the sub-cell.

In some implementations, the electrolyte structure is the basic framework and exoskeleton of the solid-state cell 100 (FIG. 1). A continuous electrolyte is required within the anode structure to transport lithium ions to and from electron conducting sites. The solid-state electrolyte can also serve as the separator 30 between anode and cathode regions, as a fully dense ceramic structure preventing growth of lithium dendrites during a cell charging cycle. In the anode and cathode regions, the electrolyte can form a porous structure that emulates a liquid electrolyte, allowing ion transfer throughout the three-dimensional space regardless of the state of charge. The electrolyte structure can seal the edges of the electrode regions, effectively completing a package around the sub-cell. The result is a structure of alternating dense and porous layers, integrated as a continuous structure throughout the cell with no apparent discontinuity at the interface of layers of similar material. At interfaces of chemically dissimilar materials, properties of the dissimilar materials are configured such that the only discontinuity at such interfaces is in the chemical composition of the interfacing layers.

In some implementations, assembly of the solid-state cell structure is accomplished by sequential deposition of layers or partial layers. The deposition of layers or partial layers can be patterned appropriately for the function of the individual layers, as precursors of the desired final materials. The precursors include mixtures of materials that form desired high density and electrochemical properties after a heat treatment. The binding materials can be separate materials from those that form the desired end material. In this case, the binding materials are removed from the structure during the heat-treating process. In other implementations, the binding materials can form the desired end material and have binding properties.

Figure 6:
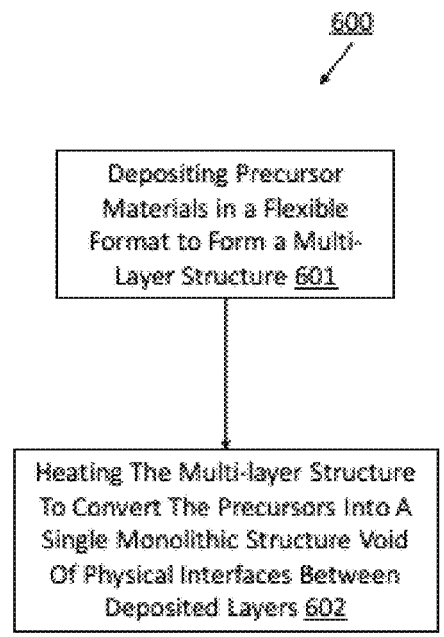
FIG. 6 is a flow chart illustrating manufacturing method of a sub-cell housing, in accordance with an implementation of the disclosure.

FIG. 6 is a flow chart illustrating the manufacturing process of a sub-cell housing. At step 601, the precursor materials are deposited in formats which are highly flexible and not brittle. For example, the precursor materials can be deposited as a fluid, including sheets which are easily plastically deformed without sacrificing the integrity of the sheet. The fluids can include pastes, flowable powders and green tapes. It should be understood that the precursors can be deposited in one format or a combination of two or more formats. After all the layers of the cell structure are deposited, the completed structure can be heat treated to convert the precursors to the desired physical and electrochemical properties at Step 602. Furthermore, the heat treatment creates a single monolithic structure with no physical interfaces between the deposited layers.

In some implementations, the precursors can be deposited using additive manufacturing techniques. For example, the precursors can be deposited using a three-dimensional (3D) printer accompanied by a computer system and guided by CAD data for each layer of the structure. In alternative implementations, the precursors can be deposited as layers of green (unfired) tape, prepared to the desired patterns, stacked in the design order and laminated together. In alternative implementations, both 3D printing and laminated tape deposition processes can be incorporated to form the complete structure.

In some implementations, although the cathode contains organic liquid electrolyte, the overall volume of liquid in the solid-state cell is about 10% of that in a standard LIB. This reduction of liquid greatly reduces the explosion and fire potential of the solid-state cell 100 compared to a standard LIB.

Figure 12A:
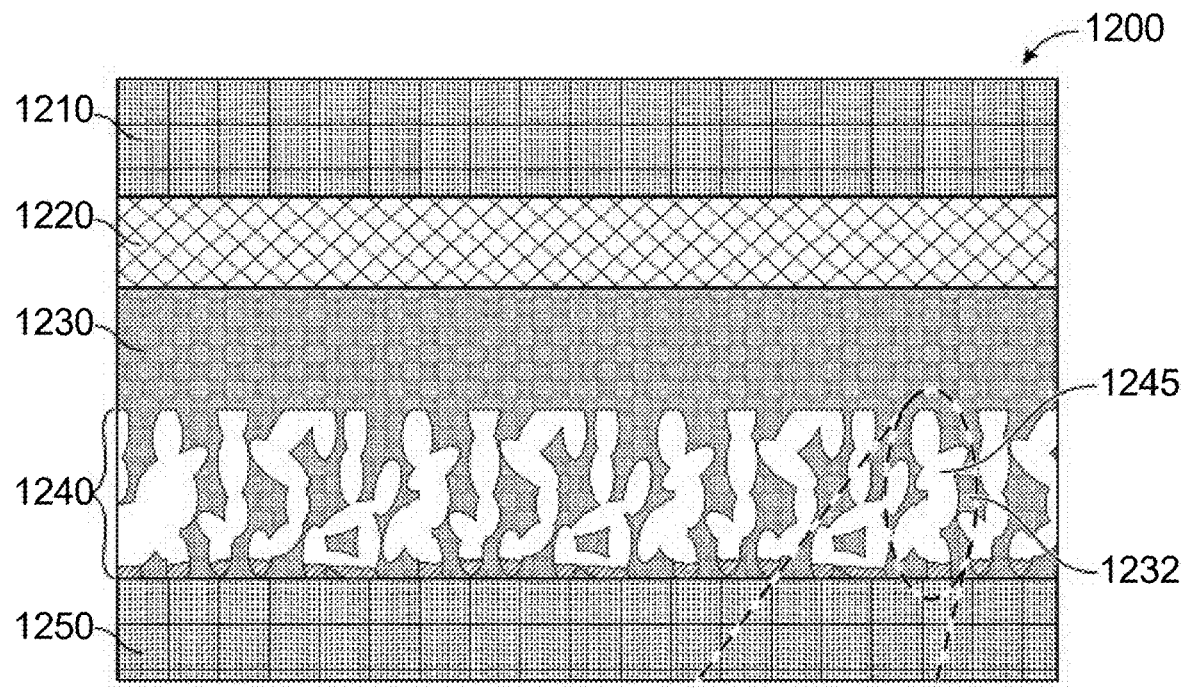
FIG. 12A is a cross-section of a solid-state battery with a 3D porous anode, according to various implementations.

FIG. 12A is a cross-section of a solid-state battery 1200, according to various implementations. In FIG. 12A, the solid-state battery 1200 includes a 3D porous anode structure 1240 that includes strands of solid-state electrolyte 1232, as well as pores 1245. The porous anode structure 1240 is in contact with an anode current collector 1250. The solid-state battery 1200 also includes a cathode current collector 1210 connected to a cathode structure 1220, and a ceramic electrolyte separator 1230 separating the cathode structure 1220 from the anode structure 1240. For example, the electrolyte separator 1230, and/or strands of solid-state electrolyte 1232 of the anode structure 1240, may be or include lithium lanthanum zirconium oxide (LLZO). It is noted that, although the present description pertains primarily to the use of a monolithic electrochemical cell housing for forming a lithium-ion battery during a charging operation, the principles disclosed in the present disclosure are not limited to the formation of lithium-ion batteries, and can be used form forming batteries having different materials as well.

Figure 12B:
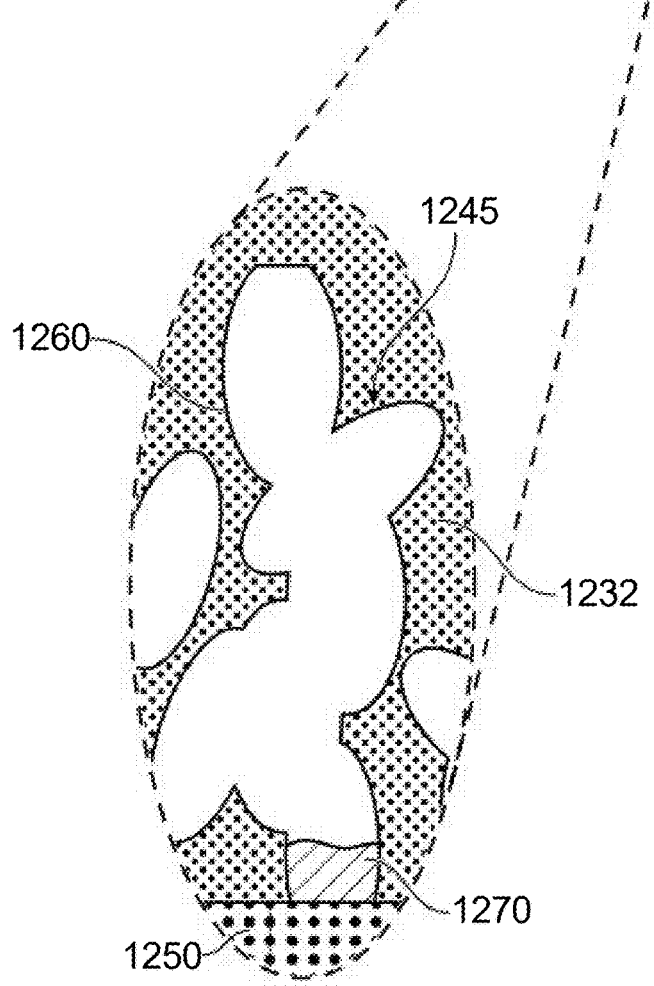
FIG. 12B is a close-up view of an exemplary pore in the anode.

FIG. 12B is an enlarged view of an exemplary one of the pores 1245 shown in FIG. 12A. In particular, FIG. 12B shows one of the pores 1245 having sidewalls 1260 which are not coated with any electronically conducting networks. Regarding this, the sidewalls 1260 of the pores 1245 are formed by edges of the solid-state ionically conducting electrolyte strands 1232 that abut the pores 1245 which extend between the solid-state ionically conducting electrolyte strands 1232 in the anode structure 1240. Although the drawings show the pores 1245 extending only vertically through the anode structure 1240, it is to be understood that portions of the pores 1245 can extend horizontally through the anode structure 1240 as well, connecting the vertical portions of the pores 1245 shown in FIGS. 12A and 12B to form a porous 3D anode structure having pores extending in both vertical and horizontal directions.

Still referring to FIGS. 12A and 12B, during charging of the lithium-ion battery 1200, lithium metal 1270, or another anode active material, that is built up in the pore 1245 will be limited to lithium which builds up on the anode current collector 1250, as shown in the enlarged view of FIG. 12B. In other words, the lithium metal 1270 shown in FIG. 12B builds up on the anode current collector 1250 during the initial charging or recharging of the battery 1200, and extends into a lower portion of the pore 1245 only from the anode current collector 1250.

More specifically, in the arrangement shown in FIGS. 12A and 12B, there are no electronically conducting networks in the pores 1245. As discussed above, and illustrated in FIGS. 12A and 12B, the porous anode 1240 is partially filled with solid ionically conducting electrolyte strands 1232 extending from the solid electrolyte separator 1230 to the anode current collector 1250. Each pore 1245 is electronically connected only to the anode current collector 1250. Referring to FIGS. 12A and 12B, during charging lithium ions are transferred from the cathode 1220, passing through the ceramic electrolyte separator 1230 and the solid ionically conducting electrolyte strands 1232 between the pores 1245, then reaching the vicinity adjacent to the anode current collector 1250. The lithium ions originating at the cathode 1220 combine with electrons provided by the anode current collector 1250 to form lithium metal 1270 at an upper surface of the anode current collector 1250. Although the lithium metal 1270 extends from the anode current collector 1250 in a lower portion of the pores 1245, full advantage of the 3D high surface area of the pores 1245 in the anode structure 1240 cannot be fully realized since the lithium plating only starts from the anode current collector 1250. The lithium plating can continue by plating onto the previously plated lithium until the entire pores are filled with the plated lithium, as shown, for example, in FIG. 4, if enough lithium ions are provided by the cathode. However, at any point of the lithium plating, the active area for the plating is smaller than a planar structure, that is, the geometric area of the anode.

Figure 13A:
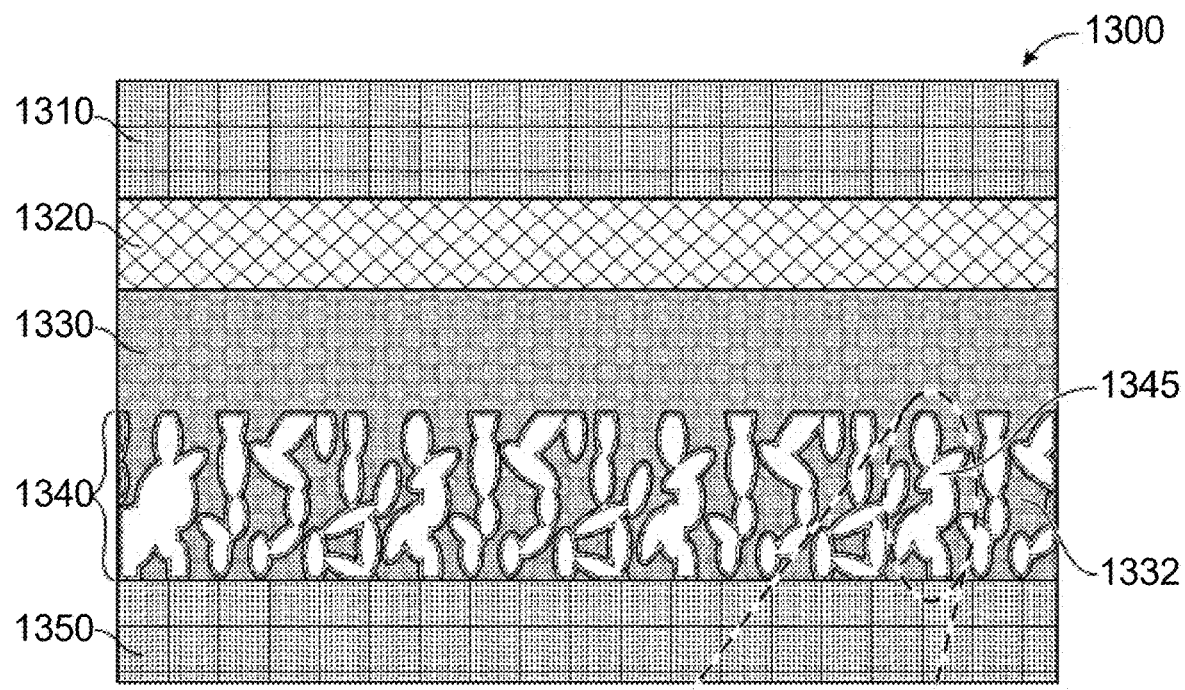
FIG. 13A is a cross-section of a solid-state battery with a 3D porous anode including an electronically conducting network formed as a coating on sidewall surfaces of pores in the anode, according to various implementations.
Figure 13B:
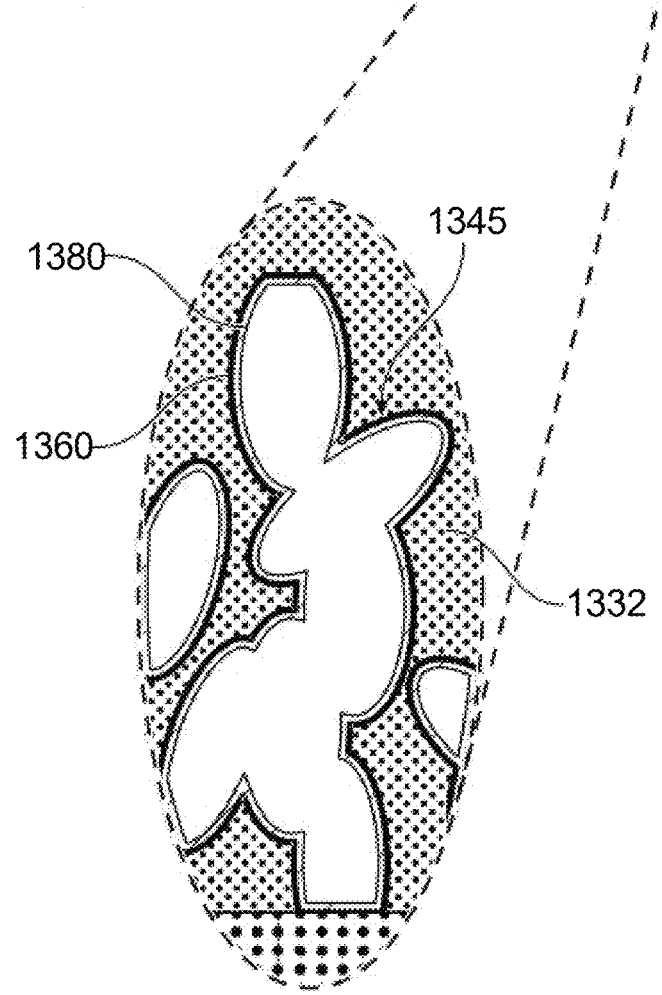
FIG. 13B is a close-up view of an exemplary pore in the anode with the electronically conducting network.

Accordingly, to fully utilize the 3D high surface area for lithium metal plating which can be achieved during charging, electronically conducting networks 1380 are incorporated on sidewall surfaces 1360 of pores 1345 of a 3D porous anode structure 1340 shown in FIGS. 13A and 13B. As illustrated in FIGS. 13A and 13B, electronically conducting material is introduced on the sidewall surfaces 1360 of the pores 1345 to form electronically conducting networks 1380. The electronically conducting networks 1380 are electronically connected with the anode current collector 1350. Similar to the above discussion regarding the sidewalls 1260 in FIGS. 12A and 12B, the sidewalls 1360 of the pores 1345 are formed by edges of the solid-state ionically conducting electrolyte strands 1332 that abut the pores 1345 which extend between the solid-state ionically conducting electrolyte strands 1332 in the anode structure 1340. Although the drawings show the pores 1345 extending only vertically through the anode structure 1340, it is to be understood that portions of the pores 1345 can extend horizontally through the anode structure 1340 as well, connecting the vertical portions of the pores 1345 shown in FIGS. 13A and 13B to form a porous 3D anode structure having pores extending in both vertical and horizontal directions More specifically, FIG. 13A is a cross-section of a solid-state battery 1300, according to various implementations, which is similar to the solid-state battery 1200 shown in FIG. 12A, except for the addition of the electronically conducting network 1380, as shown in an enlarged view in FIG. 13B. In particular, the solid-state battery 1300 includes the 3D porous anode structure 1340 that includes strands of solid-state electrolyte 1332, as well as the pores 1345. The porous anode structure 1340 is in contact with an anode current collector 1350.

Figure 14A:
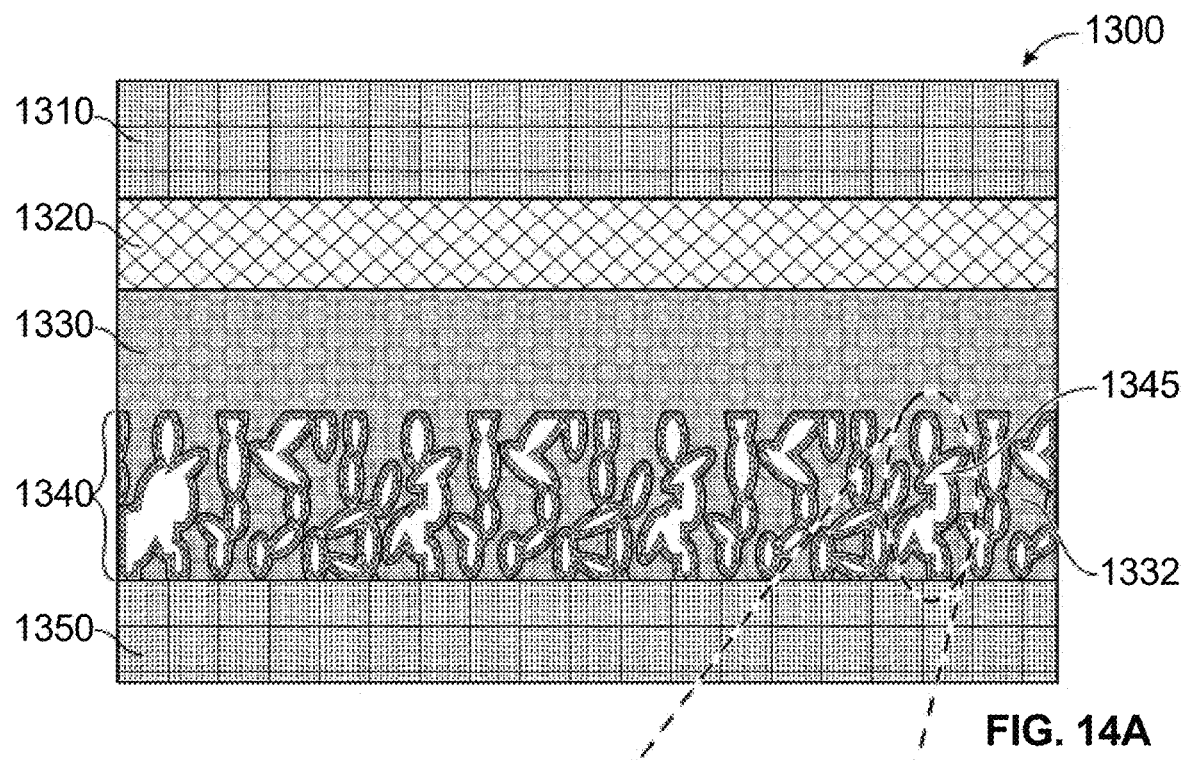
FIG. 14A is a cross-section of a solid-state battery, according to various implementations.
Figure 14B:
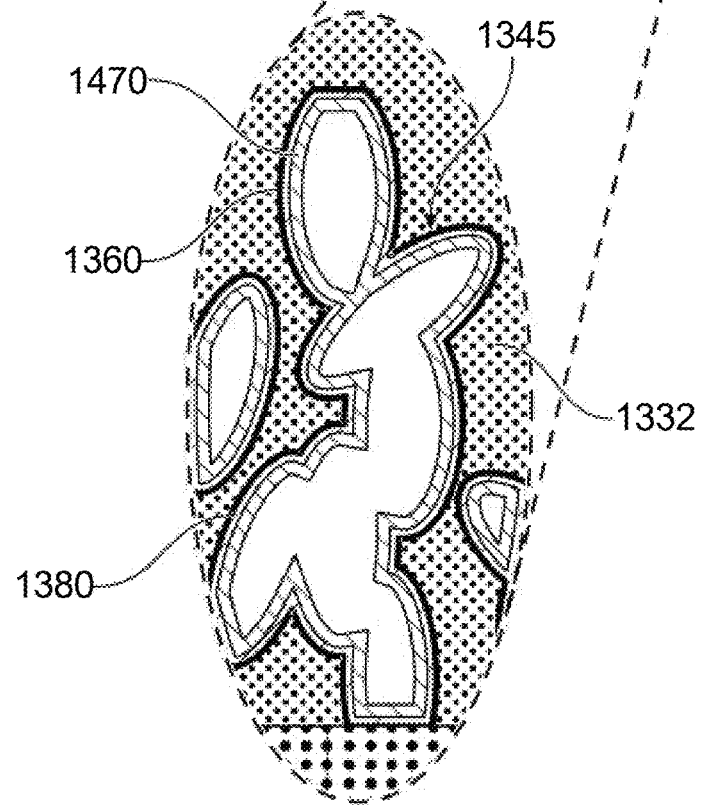
FIG. 14B is a close-up view of an exemplary pore in the anode with the electronically conducting network and lithium formed over the electronically conducting network along sidewall surfaces of the pores in the anode.

The solid-state battery 1300 also includes a cathode current collector 1310 connected to a cathode structure 1320, and a ceramic electrolyte separator 1330 separating the cathode structure 1320 from the porous anode structure 1340. The electronically conducting network 1380 extends on sidewall surfaces 1360 of the pores 1345 from the anode current collector 1350 to the electrolyte separator 1330. The electronically conducting network 1380 is configured to conduct electrons from the anode current collector 1350 along the sidewall surfaces 1360 of the pores 1345 to combine with lithium ions from the solid ionically conducting electrolyte strands 1332 to form lithium metal 1470, or another anode active material, not only on an upper surface of the anode current collector 1350, but also on the sidewalls 1360 of the pores 1345 during charging of the lithium-ion battery 1300, as shown in FIGS. 14A and 14B. The electrolyte separator 1330 and the strands of solid-state electrolyte 1332 of the anode structure 1340 may be or include lithium lanthanum zirconium oxide (LLZO).

Referring to FIGS. 14A and 14B, during charging lithium ions are transferred from the cathode 1320, passing through the ceramic electrolyte separator 1330, and the ionically conducting electrolyte strands 1332 between the pores 1345, and reaching the vicinity adjacent to the electronically conducting networks 1380. Electrons are provided by the anode current collector 1350 and transferred to the electronically conducting networks 1380, where the lithium ions from the cathode 1320 combine with the electrons from the anode current collector 1350 to form lithium metal 1470. The presence of the electronically conducting networks 1380 extending the length of the pores 1345 from the anode current collector 1350 to the ceramic electrolyte separator 1330 allows the lithium metal 1470 to plate not only at the anode current collector 1350 but also at the sidewall surfaces 1360 of the pores 1345. This greatly increases the effective surface area for lithium metal plating in the pores 1345, thereby greatly reducing the local current density and avoiding lithium dendrite formation and short circuit of the battery 1300.

Figure 15A:
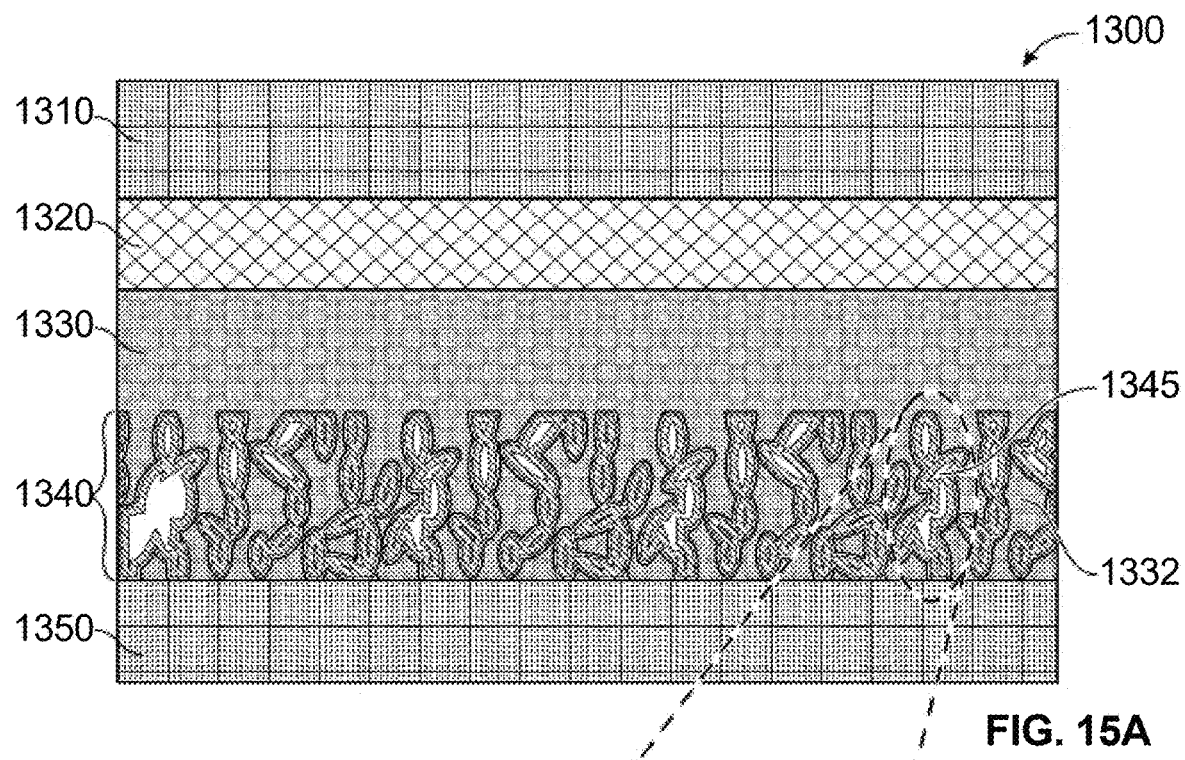
FIG. 15A is a cross-section of a solid-state battery, according to various implementations.
Figure 15B:
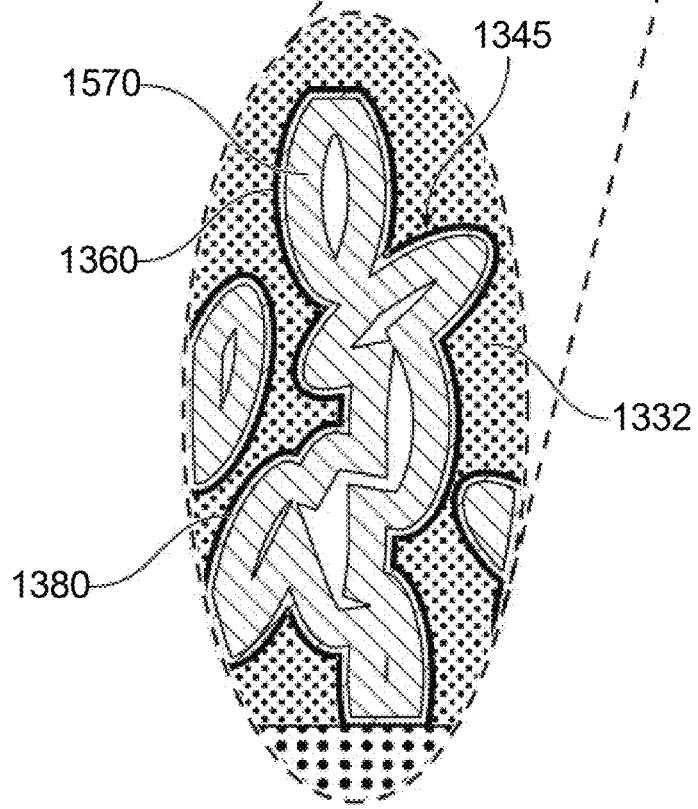
FIG. 15B is a close-up view of an exemplary pore in the anode with the electronically conducting network and lithium formed over the electronically conducting network along sidewall surfaces of the pores in the anode substantially filling the pores.

As discussed above, and as illustrated in FIGS. 14A and 14B, the pores 1345 of the 3D porous anode 1340 can be partially filled with lithium metal 1470 after the initial charging of the battery, and during subsequent recharging operations. In another implementation, as illustrated in FIGS. 15A and 15B, the pores 1345 of the 3D porous anode structure 1340 can be substantially completely filled with lithium metal 1570 after the initial charging or recharging of the battery 1300. Whether the pores 1345 are partially filled or substantially completely filled with lithium metal during charging can be controlled by various factors, including the porosity and thickness of the anode 1340, the diameter of the pores (preferably about 5 µm or less), the thickness of the electronically conducting networks 1380 (preferably about 1 µm or less), the length of the charging operation, the voltage applied during the charging operation, the amount of charge from lithium ions provided by the cathode 1320, the size relationship between the pores 1345 and the ionically conducting electrolyte strands 1332 in the anode 1340, and the amount of charge from electrons provided by the anode current collector 1350. In some embodiments, the diameter of each of the pores is less than 100 µm, preferably less than 50 µm, more preferably less than 10 µm, and most preferably less than 5 µm. It is noted that the charging operation which builds up the lithium metal 1470 of FIGS. 14A and 14B, or the lithium metal 1570 of FIGS. 15A and 15B, or other anode active material, can be initial charging of the lithium-ion battery 1300, or a subsequent recharging operation.

Figure 16:
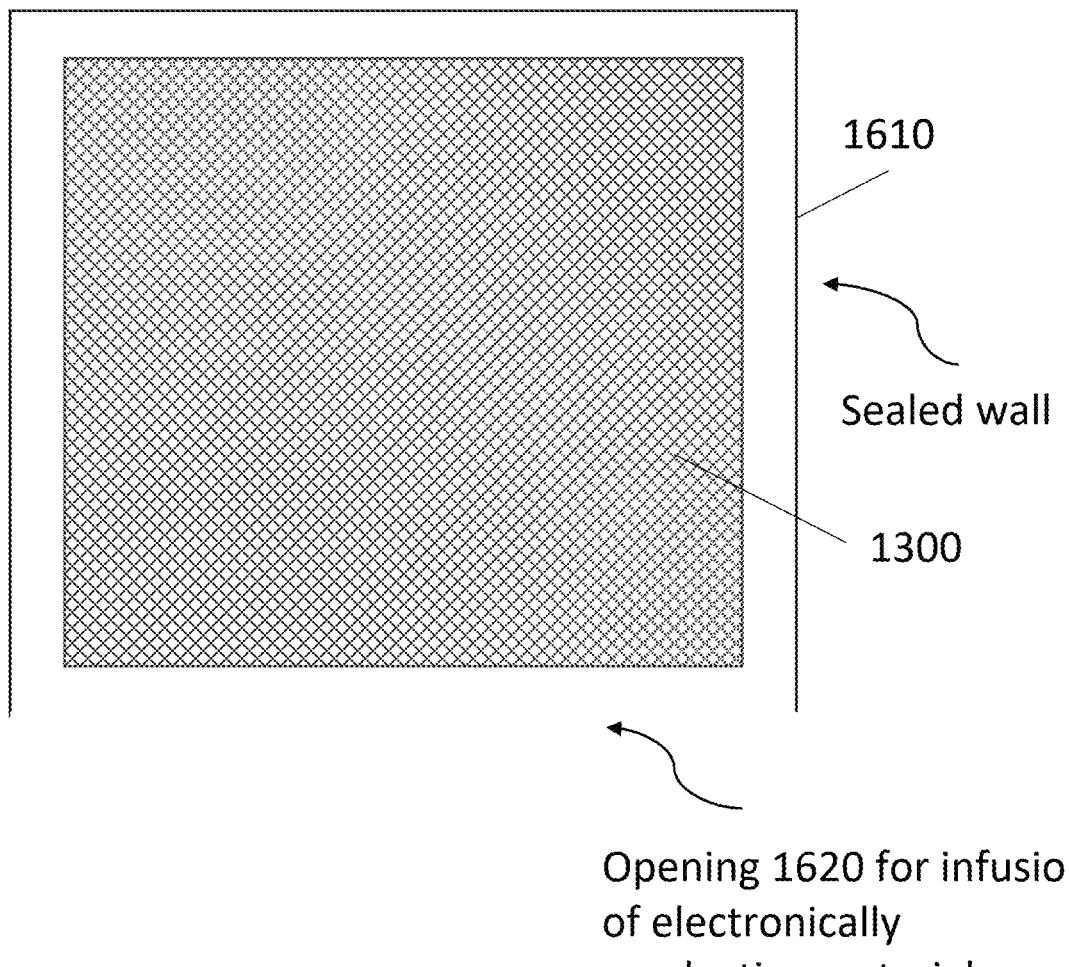
FIG. 16 is a top view of an anode of a solid-state battery, according to various implementations, illustrating an opening for infusion of electronically conducting materials.

FIG. 16 is a top view of a solid-state battery 1300 of FIGS. 13A-15B, according to various implementations. In particular, FIG. 16 shows an arrangement with a sealed wall 1610 on three sides of the solid-state battery 1300 and an opening 1620 on a fourth side of the solid-state battery 1300 allowing access to the porous anode 1340 for infusion of electronically conducting materials to form the electronically conducting network 1380 after formation of the pores 1345 shown in FIGS. 13A-15B, as will be discussed in further detail below.

The electronically conducting networks 1380 shown in FIGS. 13A-15B can comprise electronically conducting materials selected from a carbon material, a metal, a semiconductor, a conducting polymer, an electron conducting ceramic or combinations thereof. The thickness of the electronically conducting networks 1380 can be in a range from 0.01 µm to 1 µm. Preferably, the thickness of the electronically conducting networks 1380 should not be greater than $\frac{1}{10}$ of the width of the pores 1345 to avoid decreasing the amount of lithium metal 1470 that can be built up along the sidewall surfaces 1360 of the pores 1345 or fill in the pores 1345. In some implementations, the electronically conducting networks 1380 may partially cover the sidewall surfaces 1360 of the pores 1345 with a surface partial coverage, e.g., 30% to 70%, forming a web or mesh type structure on the sidewall surfaces 1360 of the pores 1345 to allow access to the lithium ions provided by the cathode structure 1320 via the electrolyte separator 1330 and the solid ionically conducting electrolyte strands 1332. In some implementations, the electronically conducting networks 1380 may be a continuous layer of the electronically conducting material, wherein the electronically conducting material comprises carbon, lithium metal or lithium metal alloy.

In a preferred implementation, the electronically conducting networks 1380 are formed from a first precursor material, specifically a precursor material which forms an electrically conducting coating incorporated in the anode precursor materials used to create the 3D porous anode structure 1340. For example, the precursor material is transformed into an electronically conducting coating on the sidewall surfaces 1360 of the pores 1345 when the pores are formed during sintering of second precursor materials and ceramic electrolyte precursor materials.

In one example, the 3D porous anode structure 1340 is formed by powder deposition process followed by sintering. A powder of a solid electrolyte material is mixed with a powder of a sacrificial pore forming material and a powder of an electronically conducting material precursor. The mixed powder is deposited as a thin layer and fixed with a binder material by binder jet printing. The deposited powder structure is then sintered, wherein the solid electrolyte material is densified to form the ionically conducting networks (i.e., the ionically conducting electrolyte strands 1332), the sacrificial pore forming material is gasified and removed from the structure forming the pores 1345, and the electronically conducting material precursor is decomposed to form the electronically conducting networks 1380.

In another example, the 3D porous anode structure 1340 is formed by a slurry or paste coating process followed by sintering. The slurry or paste is formulated by mixing a powder of a solid electrolyte material with a powder of a sacrificial pore forming material, an electronically conducting material precursor, a binder and a solvent. The slurry or paste is deposited as a thin layer by a coating technique, such as tape casting, screen printing, slot-die coating or inkjet printing. The coated structure is then dried and sintered, wherein the solid electrolyte material is densified to form the ionically conducting networks (i.e., the ionically conducting electrolyte strands 1332) in the porous anode 1340, the sacrificial pore forming material is gasified and removed from the structure forming the pores 1345, and the electronically conducting material precursor is decomposed to form the electronically conducting networks 1380.

The pore size, shape and porosity of the 3D porous anode 1340 can be controlled by the size, shape and concentration of the pore forming material. The pore forming material can be an organic or inorganic material or combinations thereof. The electronically conducting material precursor can be an organic material or inorganic material or combinations thereof consisting of an element of lithium, carbon, copper, nickel, silver, and silicon, or combinations thereof. In a particular implementation, a metal carbonate can be used as both a pore forming material and an electronically conducting material precursor.

In some implementations, the electronically conducting networks are incorporated after the porous anode structure 1340 is formed. In this case, the 3D porous anode 1340 has at least one side open without a sealed wall, as shown in FIG. 16, with the sealed wall 1610 being provided on three sides of the battery 1300, and an opening 1620 being provided for infusion of electronically conducting materials to form the electronically conducting networks 1380 on sidewall surfaces 1360 of the pores 1345. The opening 1620 allows infusion of the electronically conducting materials into the porous structure.

In some implementations, the electronically conducting networks 1380 are formed from precursors, which operate as a type of seed material to facilitate the infusion of the electronically conducting materials. For example, electronically conducting materials, serving as a seed material, are formed on the sidewall surfaces 1360 of the pores 1345 when the pores are formed during sintering of a structure made with the anode precursor materials. After sintering, the electronically conducting material is infused into the 3D porous anode, wherein the electronically conducting material is coated from the seed material on the sidewall surfaces of the pores after the infusing, the coating be configured to conduct electrons from the anode current collector along the sidewall surfaces of the pores to combine with lithium ions from the electrolyte separator to form lithium in the pores during charging of the lithium-ion battery.

In a particular implementation, lithium metal is infused to form the electronically conducting networks 1380, where a thin layer of lithium is coated at the surface of the pores 1345.

In another implementation, carbon is infused to form the electronically conducting networks 1380, where a thin layer of carbon is coated at the surface of the pores 1345. The carbon may be introduced from a carbon dispersion or a hydrocarbon precursor.

In other implementation, copper may be infused to form the electronically conducting networks, where a thin layer of copper may be coated at the surface of the pores. The copper may be introduced from, e.g., an organometallic precursor, or via chemical vapor deposition (CVD), atomic layer deposition (ALD) and electroless plating.

In another implementation, silver is infused to form the electronically conducting networks 1380, where a thin layer of silver is coated at the surface of the pores 1345. The silver may be introduced may be introduced from, e.g., an organometallic precursor, or via chemical vapor deposition (CVD), atomic layer deposition (ALD) and electroless plating.

In a further implementation, nickel is infused to form the electronically conducting networks 1380, where a thin layer of nickel is coated at the surface of the pores 1345. The nickel may be introduced from, e.g., an organometallic precursor, or via chemical vapor deposition (CVD), atomic layer deposition (ALD) and electroless plating.

In the following, further features, characteristics and advantages of the instant application will be described by means of items:

Item 1: An electrochemical cell which includes a cathode, an anode, an electrolyte separator, and an anode current collector located on the anode, wherein the anode is a three-dimensional (3D) porous anode including ionically conducting electrolyte strands extending through the anode from the anode current collector to the electrolyte separator, pores extending through the anode from the anode current collector to the electrolyte separator, and an electronically conducting network extending on sidewall surfaces of the pores from the anode current collector to the electrolyte separator.

Item 2: The electrochemical cell of item 1, wherein the electronically conducting network comprises partial coverage of the sidewall surfaces of the pores.

Item 3: The electrochemical cell of items 1 or 2, wherein the partial coverage ranges between 30-70% of a total of the sidewall surfaces of the pores.

Item 4: The electrochemical cell of any of items 1-3, wherein a thickness of the electronically conducting network is between 0.01 μm and 1.0 μm.

Item 5: The electrochemical cell of any of items 1-4, wherein a diameter of each of the pores is less than 100 μm, preferably less than 50 μm, less than 10 μm, and more preferably less than 5 μm.

Item 6: The electrochemical cell of any of items 1-5, wherein the electronically conducting network is comprised of at least one material from a group consisting of a metal, a carbon material, a semiconductor material, a conducting polymer, and an electronically conducting ceramic, or combinations thereof.

Item 7: The electrochemical cell of any of items 1-6, wherein the electronically conducting network is comprised of lithium.

Item 8: The electrochemical cell of any of items 1-7, wherein the electronically conducting network is comprised of a carbon material including at least one selected from a group consisting of carbon black, activated carbon, graphite, graphene, carbon fiber, and carbon nanotubes, or combinations thereof.

Item 9: The electrochemical cell of any of items 1-8, wherein the electronically conducting network is comprised of at least one material selected from a group consisting of silver, copper, and nickel, or combinations thereof.

Item 10: The electrochemical cell of any of items 1-9, wherein the electronically conducting network is comprised of a material formed from an electronically conducting material precursor incorporated into a sacrificial pore forming material used to create the pores, wherein the sacrificial pore forming material is configured to decompose during formation of the pores, and wherein the electronically conducting material precursor is configured to coat the sidewall surfaces of the pores to form the electronically conducting network upon completion of formation of the pores.

Item 11: The electrochemical cell of any of items 1-10, wherein the electrochemical cell is configured to be used to form a lithium-ion battery, and wherein the electronically conducting network is comprised of a material which conducts electrons from the anode current collector along the sidewall surfaces of the pores to combine with lithium ions from the ionically conducting electrolyte strands at the sidewall surfaces of the pores to form lithium in the pores during charging of the lithium-ion battery.

Item 12: A method for forming a three-dimensional (3D) porous anode for an electrochemical cell including a cathode, an anode, an electrolyte separator, comprised of a ceramic material, located between the cathode and the anode, and an anode current collector, wherein the anode comprising a 3D porous anode is located between the anode current collector and the electrolyte separator, the method including mixing a first precursor material and a second precursor material together to form a mixture, depositing the mixture as a layer where the anode is to be formed, and sintering the mixture to form the 3D porous anode with ionically conducting electrolyte strands extending through the anode from the anode current collector to the electrolyte separator, pores extending through the anode from the anode current collector to the electrolyte separator, and an electronically conducting network extending on sidewall surfaces of the pores from the anode current collector to the electrolyte separator, wherein the second precursor material is a sacrificial material configured to decompose during formation of the pores by the sintering using the second precursor material, and the first precursor material is a material which forms a coating of the electronically conducting network on the sidewall surfaces of the pores formed by sintering the second precursor material.

Item 13: The method of item 12, wherein the mixture of the first and second precursor materials comprises a powder deposition mixture.

Item 14: The method of items 12 or 13, wherein the second precursor material is comprised of a powder of a solid electrolyte material and a powder of a sacrificial pore forming material.

Item 15: The method of any of items 12-14, wherein the powder deposition mixture is fixed with a binder material by a binder jet printing operation prior to the sintering.

Item 16: The method of any of items 12-15, wherein the mixture of the first and second precursor materials comprises a slurry including a powder of a solid electrolyte material, a powder of a sacrificial pore forming material, an electronically conducting material precursor, a binder and a solvent.

Item 17: The method of any of items 12-16, further including depositing the slurry by a coating technique selected from a group consisting of tape casting, screen printing, slot-die coating, and inkjet printing.

Item 18: The method of any of items 12-17, wherein the first precursor material comprises a metal carbonate.

Item 19: The method of any of items 12-18, wherein the electrochemical cell is configured to be used to form a lithium-ion battery, and wherein the electronically conducting network extends on sidewall surfaces of the pores from the anode current collector to the electrolyte separator, and is comprised of a material which conducts electrons from the anode current collector along the sidewall surfaces of the pores to combine with lithium ions from the ionically conducting electrolyte strands at the sidewall surfaces of the pores to form lithium in the pores during charging of the lithium-ion battery.

Item 20: The method of any of items 12-19, wherein first precursor material includes at least one material selected from an organic material or inorganic material or combinations thereof.

Item 21: A method for forming a 3D porous anode for an electrochemical cell including a cathode, an anode, an electrolyte separator, comprised of a ceramic material, located between the cathode and anode, and an anode current collector, wherein the anode comprising a three-dimensional (3D) porous anode is located between the anode current collector and the electrolyte separator, the method including depositing the mixture of a powder of solid electrolyte material and a powder of a sacrificial pore forming material as a layer where the anode is to be formed, sintering the mixture to form pores to form the 3D porous anode, and infusing an electronically conducting material into the 3D porous anode after the sintering, to coat sidewall surfaces of the pores, wherein the electrochemical cell is configured to be used to form a lithium-ion battery, and wherein the electronically conducting material is comprised of a material which conducts electrons from the anode current collector along the sidewall surfaces of the pores to combine with lithium ions from the ionically conducting electrolyte strands at the sidewall surfaces of the pores to form lithium in the pores during charging of the lithium-ion battery.

While some implementations have been shown and described, it will be obvious to those skilled in the relevant arts that changes and modifications may be made without departing from the invention in its broader aspects. Therefore, the aim in the appended claims is to cover all such changes and modifications that fall within the true spirit and scope of the invention. The matter set forth in the foregoing description and accompanying drawings is offered by way of illustration only and not as a limitation. The actual scope of the invention is intended to be defined in the following claims when viewed in their proper perspective based on the prior art.

The terminology used herein is for the purpose of describing particular implementations only and is not intended to limit the invention. As used herein, the singular forms "a," "an," and "the" are intended to include the plural forms as well, unless the context clearly indicates otherwise. Furthermore, to the extent that the terms "including," "includes," "having," "has," "with," or variants thereof are used in either the detailed description and/or the claims, such terms are intended to be inclusive in a manner similar to the term "comprising."

Unless otherwise defined, all terms (including technical and scientific terms) used herein have the same meaning as commonly understood by one of ordinary skill in the art to which this invention belongs. Furthermore, terms, such as those defined in commonly used dictionaries, should be interpreted as having a meaning that is consistent with their meaning in the context of the relevant art, and will not be interpreted in an idealized or overly formal sense unless expressly so defined herein.

While various embodiments have been described, the description is intended to be exemplary, rather than limiting, and it is understood that many more embodiments and implementations are possible that are within the scope of the embodiments. Although many possible combinations of features are shown in the accompanying figures and discussed in this detailed description, many other combinations of the disclosed features are possible. Any feature of any embodiment may be used in combination with or substituted for any other feature or element in any other embodiment unless specifically restricted. Therefore, it will be understood that any of the features shown and/or discussed in the present disclosure may be implemented together in any suitable combination. Accordingly, the embodiments are not to be restricted except in light of the attached claims and their equivalents. Also, various modifications and changes may be made within the scope of the attached claims.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein.

Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that the claims require more features than are expressly recited in each claim. Rather, as the following claims reflect, inventive subject matter lies in less than all features of a single disclosed example. Thus, the following claims are hereby incorporated into the Detailed Description, with each claim standing on its own as a separately claimed subject matter.

What is claimed is:

1. A method for forming a three-dimensional (3D) porous anode for an electrochemical cell including a cathode, an anode, an electrolyte separator, comprised of a ceramic material, located between the cathode and the anode, and an anode current collector, wherein the anode comprising a 3D porous anode is located between the anode current collector and the electrolyte separator, the method comprising:
   mixing a first precursor material and a second precursor material together to form a mixture;
   depositing the mixture as a layer where the anode is to be formed; and
   sintering the mixture to form the 3D porous anode with ionically conducting electrolyte strands extending through the anode from the anode current collector to the electrolyte separator, pores extending through the anode from the anode current collector to the electrolyte separator, and an electronically conducting network extending on sidewall surfaces of the pores from the anode current collector to the electrolyte separator,
   wherein the second precursor material is a sacrificial material configured to decompose during formation of the pores by the sintering using the second precursor material, and the first precursor material is a material which forms a coating of the electronically conducting network on the sidewall surfaces of the pores formed by sintering the second precursor material.

2. The method of claim 1, wherein the mixture of the first and second precursor materials comprises a powder deposition mixture.

3. The method of claim 2, wherein the second precursor material is comprised of a powder of a solid electrolyte material and a powder of a sacrificial pore forming material.

4. The method of claim 3, wherein the powder deposition mixture is fixed with a binder material by a binder jet printing operation prior to the sintering.

5. The method of claim 3, wherein the powder of the solid electrolyte material, and the powder of the sacrificial pore forming material are mixed together with the first precursor material, a binder and a solvent to form a slurry.

6. The method of claim 5, further comprising depositing the slurry by a coating technique selected from a group consisting of tape casting, screen printing, slot-die coating, and inkjet printing.

7. The method of claim 1, wherein the first precursor material comprises a metal carbonate.

8. The method of claim 1, wherein the electrochemical cell is configured to be used to form a lithium-ion battery, and wherein the electronically conducting network extends on sidewall surfaces of the pores from the anode current collector to the electrolyte separator, and is comprised of a material which conducts electrons from the anode current collector along the sidewall surfaces of the pores to combine with lithium ions from the ionically conducting electrolyte strands at the sidewall surfaces of the pores to form lithium in the pores during charging of the lithium-ion battery.

9. The method of claim 1, wherein first precursor material includes at least one material selected from an organic material or inorganic material or combinations thereof.

10. The method of claim 1, further comprising controlling a size, shape and porosity of the 3D porous anode by controlling one or more of a size, shape and concentration of the second precursor material.

11. The method of claim 10, wherein a diameter of the pores is less than 10 μm.

12. The method of claim 10, wherein a diameter of the pores is less than 5μm.

13. The method of claim 1, wherein the second precursor material comprises an organic material, an inorganic material, or a combination thereof.

14. The method of claim 1, wherein the first precursor comprises an organic material or an inorganic material or combinations thereof consisting of at least one element selected from a group consisting of: lithium; carbon; copper, nickel, silver, and silicon.

15. The method of claim 7, wherein the second precursor material comprises a metal carbonate.

16. The method of claim 1, wherein the anode comprises a border which hermetically seals the anode from the cathode.

17. The method of claim 16, wherein the border comprises a low porosity border configured to completely seal the anode from a surrounding environment.

18. The method of claim 1, wherein the anode is disposed in an anode receptive space, the cathode is disposed in a cathode receptive space, and the anode receptive space includes a filling aperture including a seal configured to isolate the anode from catholyte material contained in the cathode receptive space.

19. The method of claim 18, wherein the seal is configured to provide pressure relief for the anode receptive space.

20. The method of claim 19, wherein the catholyte includes liquid catholyte material located in a cathode receptive space.

* * * * *